United States Patent
Otake et al.

(10) Patent No.: US 11,345,338 B2
(45) Date of Patent: May 31, 2022

(54) VEHICLE CONTROL DEVICE

(71) Applicant: HONDA MOTOR CO., LTD., Tokyo (JP)

(72) Inventors: Hideharu Otake, Wako (JP); Yuki Nakada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/205,492

(22) Filed: Mar. 18, 2021

(65) Prior Publication Data

US 2021/0291812 A1    Sep. 23, 2021

(30) Foreign Application Priority Data

Mar. 19, 2020    (JP) .............................. JP2020-048831

(51) Int. Cl.
*B60W 30/06* (2006.01)
*B60W 50/14* (2020.01)
*G08G 1/14* (2006.01)

(52) U.S. Cl.
CPC ............ *B60W 30/06* (2013.01); *B60W 50/14* (2013.01); *G08G 1/143* (2013.01); *B60W 2050/146* (2013.01)

(58) Field of Classification Search
CPC .................. B60W 30/06; B60W 50/14; B60W 2050/146; G08G 1/143; B62D 15/0285
See application file for complete search history.

(56) References Cited

U.S. PATENT DOCUMENTS

| | | | | |
|---|---|---|---|---|
| 2005/0060073 | A1* | 3/2005 | Tanaka | B62D 15/0285 701/36 |
| 2008/0033633 | A1* | 2/2008 | Akiyoshi | G06Q 10/02 701/418 |
| 2011/0082613 | A1* | 4/2011 | Oetiker | B60W 10/20 701/25 |
| 2014/0121883 | A1* | 5/2014 | Shen | B62D 15/0285 701/28 |
| 2016/0131495 | A1* | 5/2016 | Su | G01C 21/3626 701/442 |
| 2018/0094944 | A1* | 4/2018 | Su | G01C 21/3667 |
| 2018/0244287 | A1* | 8/2018 | Kirstein | G08G 1/168 |
| 2020/0211391 | A1* | 7/2020 | Li | G05D 1/0212 |
| 2020/0346639 | A1* | 11/2020 | Tashiro | G01C 21/34 |

FOREIGN PATENT DOCUMENTS

JP    2013-035327 A    2/2013

* cited by examiner

*Primary Examiner* — Daryl C Pope
(74) *Attorney, Agent, or Firm* — Carrier Blackman & Associates, P.C.; Joseph P. Carrier; Jeffrey T. Gedeon

(57) ABSTRACT

A movement path is regenerated within a movement capable region in accordance with an instruction to correct a movement path by a pointing unit, and the regenerated movement path is displayed on a display unit in a superimposed manner on a movement capable region for a user's own vehicle. As a result, without changing a parking space (position) in which a vehicle occupant desires to park, it is possible for parking to be performed along the desired movement path to the desired parking space.

4 Claims, 6 Drawing Sheets

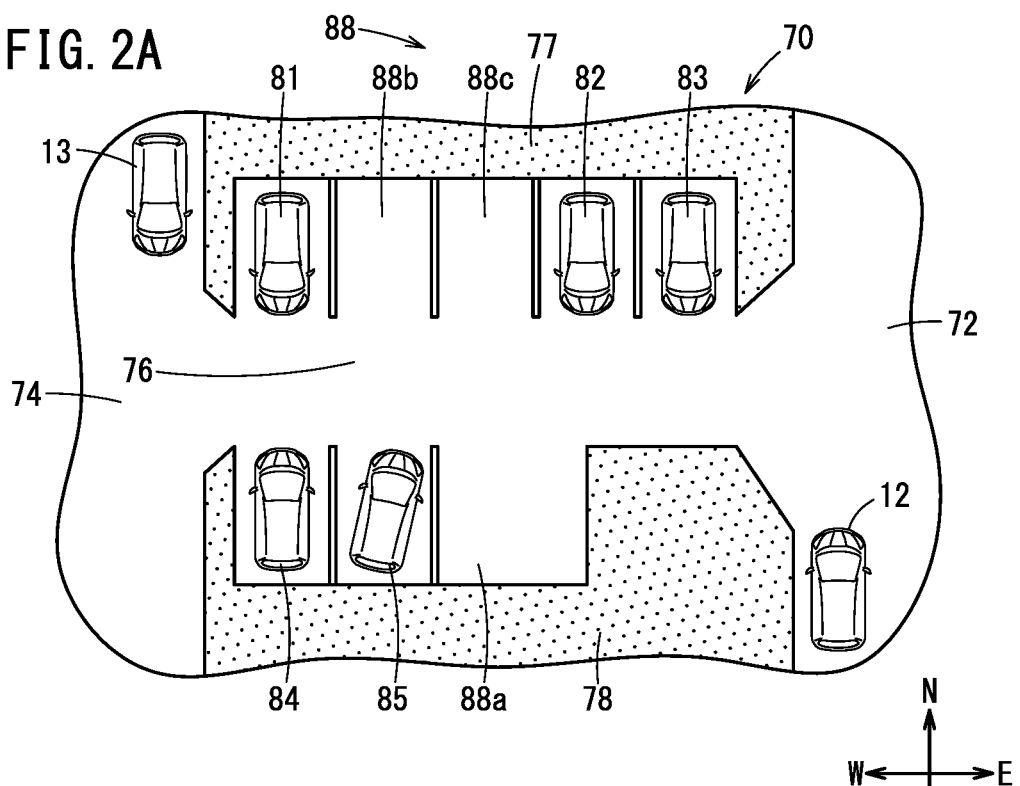
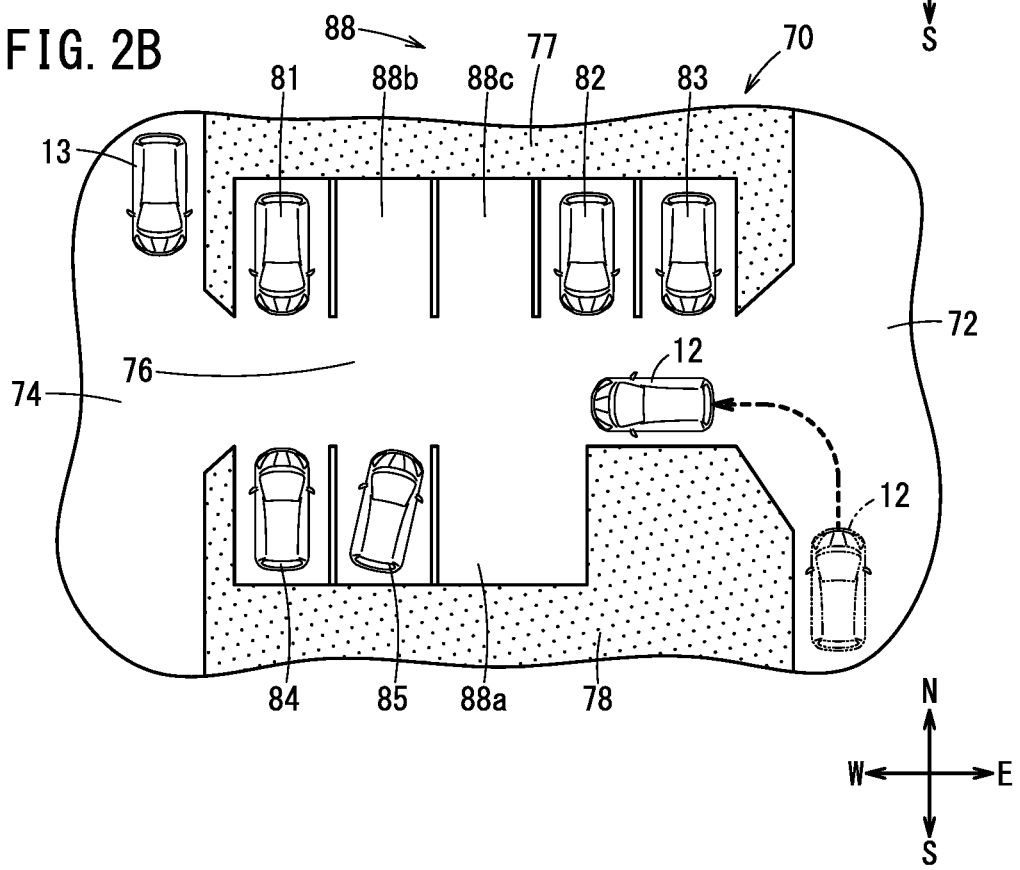

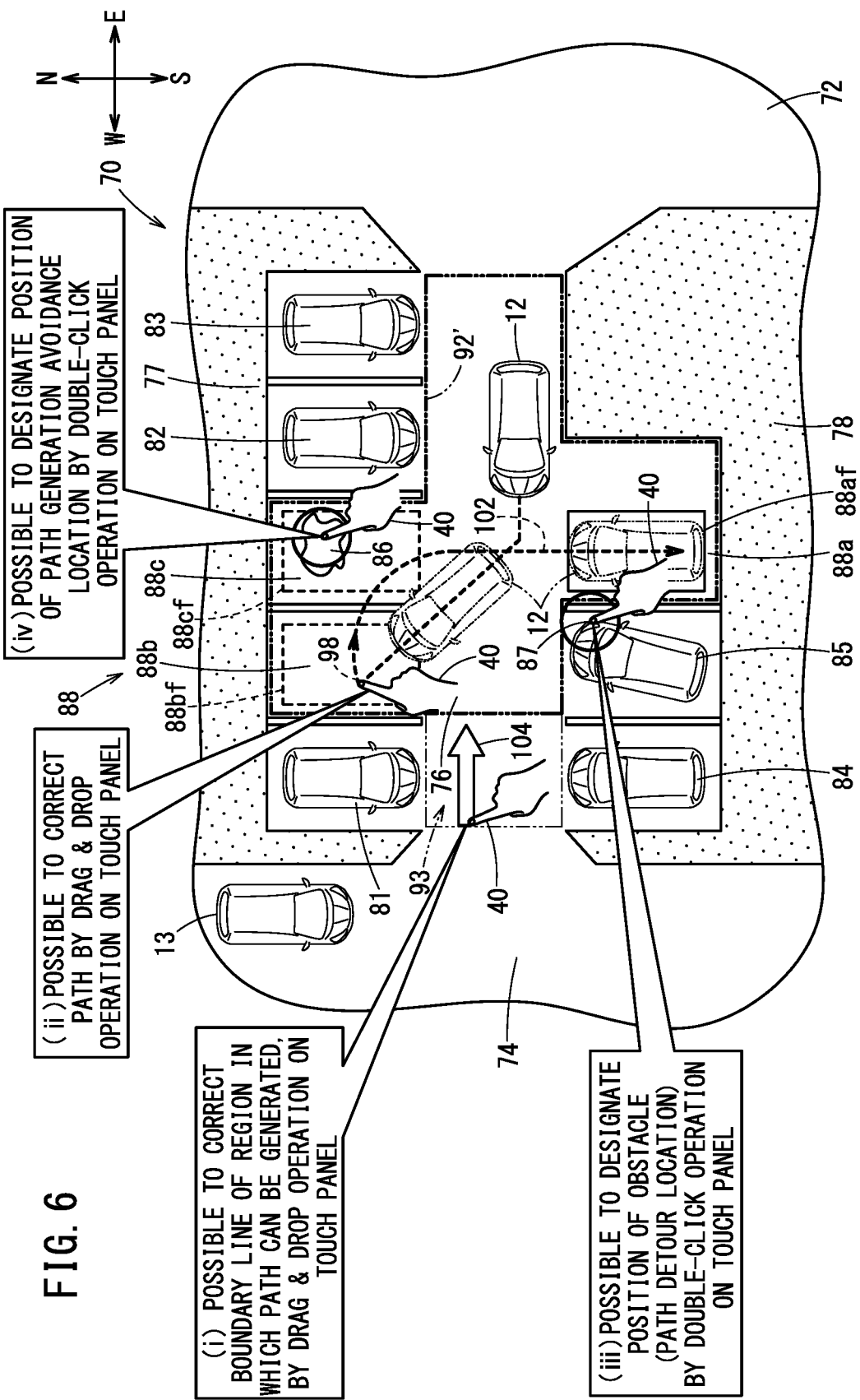

VEHICLE CONTROL DEVICE

CROSS-REFERENCE TO RELATED APPLICATION

This application is based upon and claims the benefit of priority from Japanese Patent Application No. 2020-048831 filed on Mar. 19, 2020, the contents of which are incorporated herein by reference.

BACKGROUND OF THE INVENTION

Field of the Invention

The present invention relates to a vehicle control device which causes a user's own vehicle to be automatically parked inside a parking space based on outputs of external environment sensors provided in the user's own vehicle.

Description of the Related Art

For example, in Japanese Laid-Open Patent Publication No. 2013-035327 (hereinafter referred to as JP2013-035327A), a parking assist device is disclosed in which parking spaces in which a user's own vehicle is capable of parking are displayed on a display, and which enables, from among the displayed parking spaces, a parking space in which a driver desires to park to be set as a target parking space.

SUMMARY OF THE INVENTION

Generally, according to one example of a conventional automated parking method, when garaging is performed, for example, when a vehicle is caused to be parked in a U-shaped parking space on a left side of the vehicle as viewed in plan, the vehicle is advanced and stopped at a position (starting position of parking) on a rearward trajectory that enables fitting into a parking space with a minimum turning radius of the rear wheels of the vehicle.

Next, the front wheels perform stationary steering (full steering when the vehicle is stopped) in a manner so that the front wheels are turned at a maximum steering angle at the starting position of parking, and then rearward parking of the vehicle is carried out. By generating such a movement path, it is possible to carry out garaging on the movement path in which forward movement and rearward movement can be completed only one time.

Incidentally, on the movement path which is set in this manner, cases may arise in which there are locations, such as puddles, muddy areas, or the like, where the vehicle occupant seeks to avoid entering.

In this case, in the conventional parking assist device in which automated parking is performed, there is a possibility that travel through such an avoidance location can be avoided by changing the desired parking space to another parking space (position).

However, since the conventional parking assist device does not display a parking movement path (i.e., a movement path by which parking is performed), even if the parking space is changed, it is not possible for the driver to accurately determine whether or not travel through the avoidance location can be securely avoided. In addition, when the parking space is changed, it is not possible to satisfy the intention of the vehicle occupant to park in a desired parking space (position).

The present invention has been devised taking into consideration the aforementioned problems, and has the object of providing a vehicle control device, which enables parking along a desired movement path to a desired parking space (position) in which the vehicle occupant desires to park, without changing the parking space.

A vehicle control device according to one aspect of the present invention is configured to cause a user's own vehicle to be automatically parked inside a parking space, based on outputs of external environment sensors provided in the user's own vehicle, the vehicle control device comprising an external environment recognition unit configured to recognize a movement capable region for the user's own vehicle based on the outputs of the external environment sensors, a display unit configured to display the movement capable region for the user's own vehicle as recognized by the external environment recognition unit and a parking space, a pointing unit configured to enable selection of a desired parking space from a display on the display unit, and an action planning unit configured to generate a movement path for parking from a starting position of parking to a position inside the selected parking space, and to display the movement path in a superimposed manner on the display unit, wherein the pointing unit is configured to provide an instruction to correct the movement path generated by the action planning unit, and in a case that an instruction to correct the movement path is provided by the pointing unit, the action planning unit regenerates the movement path within the movement capable region in accordance with the instruction to correct, and displays the regenerated movement path in a superimposed manner on the movement capable region on the display unit.

According to the one aspect of the present invention, the movement path is regenerated within the movement capable region in accordance with the instruction to correct the movement path by the pointing unit, and the regenerated movement path is displayed on the display unit in a superimposed manner on the movement capable region for the user's own vehicle, whereby, without changing the parking space (position) in which the vehicle occupant desires to park, it is possible for parking to be performed along the desired movement path to the desired parking space.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2A is a schematic plan view showing an example of a parking lot in which it is intended for a user's own vehicle to be parked, a usage situation of the parking lot, and a situation of the surrounding vicinity;

FIG. 2B is a schematic plan view showing a state in which the user's own vehicle is stopped at an entrance of the parking lot;

FIG. 6 is a schematic plan view showing a state in which a desired movement path after correction thereof is generated.

DETAILED DESCRIPTION OF THE
PREFERRED EMBODIMENTS

Preferred embodiments of a vehicle control device according to the present invention will be presented and described in detail below with reference to the accompanying drawings.

Embodiment

[Configuration]

Figure 1:
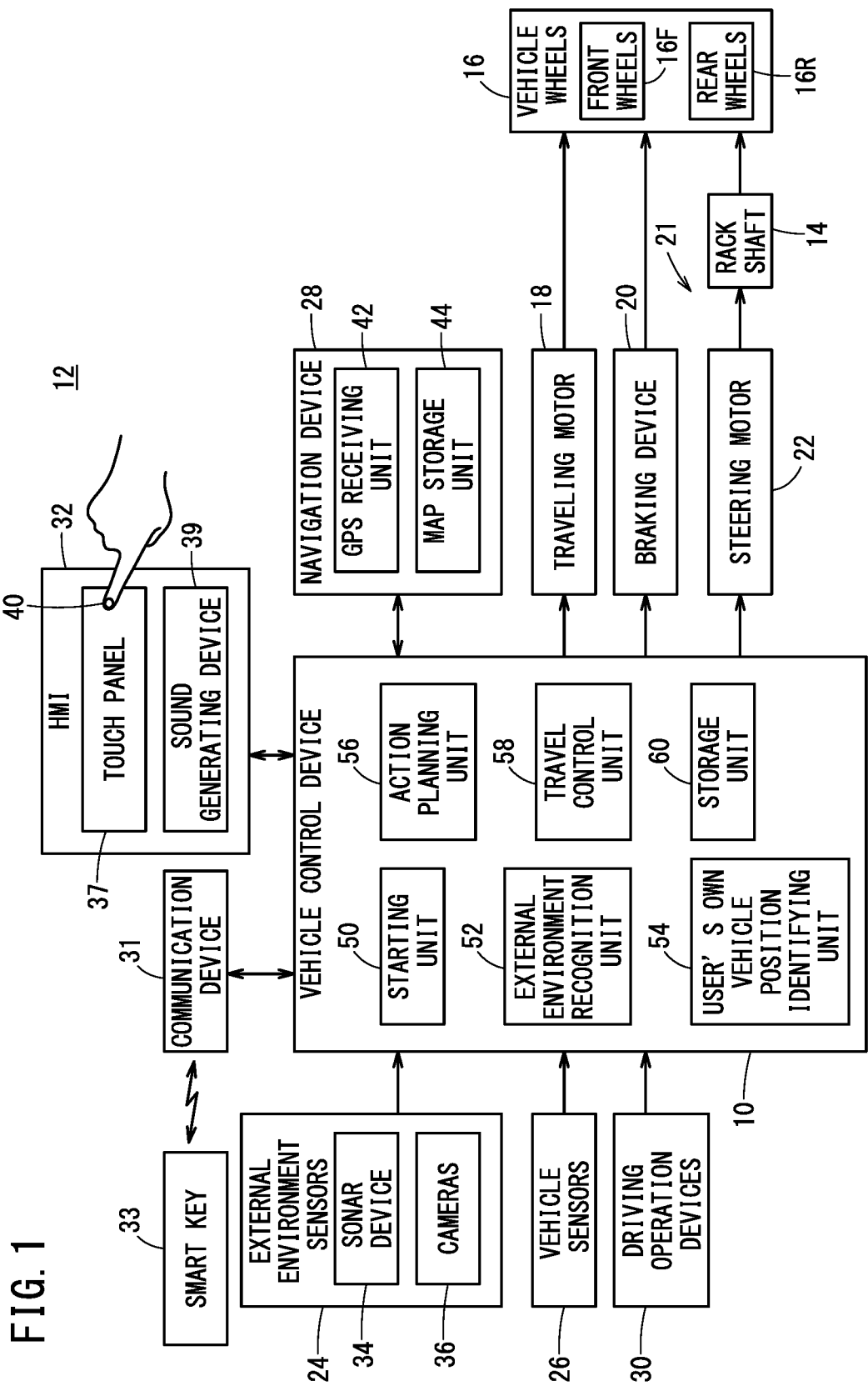
FIG. 1 is a block diagram showing an exemplary configuration of a vehicle equipped with a vehicle control device according to an embodiment.

FIG. 1 is a block diagram showing an exemplary configuration of a four-wheeled vehicle (user's own vehicle) 12 equipped with a vehicle control device 10 according to an embodiment.

As shown in FIG. 1, in addition to the vehicle control device 10, the vehicle 12 includes vehicle wheels (steerable front wheels 16F, and rear wheels 16R serving as drive wheels) 16, wherein the left and right front wheels are steered through a rack shaft 14.

As constituent elements connected to the vehicle control device 10, the vehicle 12 is further equipped with a traveling motor (propulsion device) 18, a braking device 20, a steering motor 22, external environment sensors 24, vehicle sensors 26, a navigation device 28, driving operation devices 30, a communication device 31, and an HMI (Human Machine Interface) 32.

The constituent elements connected to the vehicle control device 10 are capable of transmitting signals mutually to each other by a communication line such as a CAN (Controller Area Network).

The traveling motor 18 applies a propulsive force (a forward force or a rearward force) to the vehicle wheels 16 (the front wheels 16F and/or the rear wheels 16R), and thereby causes the vehicle 12 to travel. Moreover, although the vehicle 12 according to the present embodiment is an electric automobile (including a fuel cell vehicle) which is powered by a battery, the vehicle 12 may be an internal combustion engine automobile in which an internal combustion engine and a transmission are used instead of the traveling motor 18, or may be a hybrid vehicle in which both the internal combustion engine and the traveling motor 18 are used.

The braking device 20 is a device that applies a braking force to the vehicle wheels 16 (the front wheels 16F and/or the rear wheels 16R), and includes, for example, brake calipers that serve to press pads against brake discs, and an electric cylinder that supplies hydraulic pressure to the brake calipers. The braking device 20 may include an electric parking brake (EPB) device that regulates the rotation of the vehicle wheels 16.

The steering motor 22 includes a pinion on a main shaft, and forms a rack and pinion mechanism together with the rack shaft 14, and by applying an axial force (referred to as a rack axial force, or simply, an axial force or a steering axial force) to the rack shaft 14 which extends in the vehicle widthwise direction, the steering motor 22 applies a steering angle (turning angle) to the vehicle wheels 16 (the front wheels 16F). In this instance, the steering motor 22, the pinion, and the rack shaft 14, which are provided in order to change the steering angle of the vehicle wheels 16 (the front wheels 16F), form a steering system 21. Moreover, the steering system 21 may be provided with a transmission mechanism that boosts the rotational driving force (motor driving force) of the main shaft of the steering motor 22.

The traveling motor 18, the braking device 20, and the steering motor 22 are controlled by the vehicle control device 10.

The external environment sensors 24 include sonar devices 34 and cameras 36. The external environment sensors 24 may also include a millimeter wave radar device or a laser LiDAR device. The external environment sensors 24 output detection results (external environmental information) to the vehicle control device 10.

The sonar devices 34 are ultrasonic sensors, which emit ultrasonic waves around the periphery of the vehicle 12, and by capturing reflected waves therefrom, serve to detect the position of peripheral objects outside of the vehicle 12 (including parking spaces in terms of distance and direction). A plurality of such sonar devices 34 are provided respectively on a rear portion and a front portion of the vehicle 12. According to the present embodiment, the sonar devices 34 are provided in two pairs on the rear bumper, in two pairs on the front bumper, and in one pair on each of the front end left and right side surfaces and the rear end left and right side surfaces of the vehicle 12, thus providing a total of six pairs.

The sonar devices 34 provided on the rear bumper primarily serve to detect the positions of objects behind the vehicle 12. The sonar devices 34 provided on the front bumper primarily serve to detect the positions of objects in front of the vehicle 12. The sonar devices 34 provided on the front end left and right side surfaces of the vehicle 12 serve to detect the positions of objects on the left and right outer sides, respectively, of the front end of the vehicle, whereas the sonar devices 34 provided on the rear end left and right side surfaces of the vehicle 12 serve to detect the positions of objects on the left and right outer sides, respectively, of the rear end of the vehicle. By the sonar devices 34 provided on the front end left and right side surfaces and the rear end left and right side surfaces, it is possible to detect a parking space {if the parking space is U-shaped, the opening length (width) and the depth thereof} positioned on a side surface of the vehicle 12.

The cameras 36 are devices that capture images of the surrounding periphery of the vehicle 12. The cameras 36 include a front camera that captures images of the front of the vehicle 12, and a rear camera that captures images of the rear of the vehicle 12. The cameras 36 may be provided in the vicinity of locations of the vehicle 12 where the door mirrors are installed, and may include a pair of left and right door mirror cameras which capture images of the left and right rear sides of the vehicle 12.

The cameras 36 may further include a pair of left and right pillar cameras provided on center pillars (B pillars), and which capture images of the left and right outer sides of the vehicle 12. By the cameras 36, it is possible to detect the parking spaces, and further, it is possible to cause an image of the vicinity in which the parking spaces are included to be displayed on a touch panel 37 which also serves as a display unit (display) of the HMI 32.

The touch panel 37 is configured such that a pointer and icons displayed on the touch panel 37 can be operated through operation of a pointing unit (a finger of the vehicle occupant or a pointing device) 40 (a finger is schematically depicted in FIG. 1). As the pointing device, a stylus pen, a joystick, or the like may also be used.

The vehicle sensors 26 include a vehicle speed sensor that detects a speed (vehicle speed) of the vehicle 12, an acceleration sensor that detects an acceleration, a yaw rate sensor that detects an angular velocity about a vertical axis, and an orientation sensor that detects an orientation of the vehicle 12.

The communication device 31 mediates wireless communications between the vehicle control device 10 and a smart key (portable device) 33.

The navigation device 28 is a device that acquires a current position of the vehicle 12, and carries out route guidance to a destination. The navigation device 28 includes a GPS receiving unit (positioning sensor) 42, and a map storage unit 44. The GPS receiving unit 42 identifies a position (latitude and longitude) of the vehicle 12 based on signals received from an artificial satellite (positioning satellite).

The map storage unit 44 is made up from a well-known type of storage device such as a hard disk or the like, and includes map information, which includes the position and a plan view of a parking lot, recorded therein.

The driving operation devices 30 are provided in the vehicle interior, and receive input operations performed by the vehicle occupant in order to control the vehicle 12.

The driving operation devices 30 include a steering wheel, an accelerator pedal, a brake pedal, a shift lever, and a power switch (push start switch). The power switch receives an input operation from the vehicle occupant in order to start the vehicle 12.

Moreover, the vehicle 12, as was discussed above, is an electric vehicle the power source of which is a battery (including a fuel cell). According to the present embodiment, a propulsive force by the traveling motor 18, a steering force by the steering motor 22, and a braking force by the braking device 20 are generated using a so-called "by wire" method.

The driving operation devices 30 may further include a switch for operating an electric parking brake device.

Each of the driving operation devices 30 includes an operation amount sensor which detects the positions of switches (including ON and OFF) and analog operation amounts, and outputs to the vehicle control device 10 signals (switch position and operation amount signals) indicative of operations thereof.

The HMI 32 notifies the vehicle occupant of various information by way of display or voice, together with accepting input operations made by the vehicle occupant. The HMI 32 includes the touch panel 37 that also serves as a display unit which accepts the input operations, and a sound generating device 39 such as a buzzer, a speaker, or the like. Moreover, the HMI 32 may be used as a display and audio device which also serves as a touch panel. Further, the HMI 32 may be configured by using a portion of the functions of the navigation device 28.

The vehicle control device 10 is an electronic control device (ECU) which includes a CPU, a ROM, a RAM, and the like. The vehicle control device 10 includes functional units which execute various vehicle controls by the CPU carrying out arithmetic processing in accordance with programs. The vehicle control device 10 may also be configured in the form of hardware.

The vehicle control device 10 includes a function of causing the vehicle 12 to be automatically parked in a parking space.

In order to perform an automated parking control, the vehicle control device 10 includes respective functional units such as a starting unit 50, an external environment recognition unit 52, a user's own vehicle position identifying unit 54, an action planning unit 56, and a travel control unit 58, and a storage unit 60.

Based on a signal from a power switch from among the driving operation devices 30, the starting unit 50 carries out authentication of the smart key 33, and determines whether the smart key 33 is inside the vehicle. When the smart key 33 is authenticated, and the smart key 33 is determined to be inside the vehicle, the starting unit 50 enables driving of the traveling motor 18 and the steering motor 22 by the travel control unit 58. Further, when an automated parking button, which is displayed on the touch panel 37 of the HMI 32, is placed in an ON state, and a parking space, which is also displayed on the touch panel 37, is selected, the starting unit 50 causes the automated parking control to be initiated by the action planning unit 56.

Based on the detection results of the external environment sensors 24, the external environment recognition unit 52 recognizes, for example, in addition to obstacles such as parked vehicles, stopped vehicles, rocks, walls, hedges, and the like that exist around the periphery of the vehicle 12, rough road locations such as puddles, muddy areas, and the like, and acquires information such as the positions and sizes of the obstacles and the rough road locations.

More specifically, on the basis of a well-known image analysis method such as pattern matching or the like, the external environment recognition unit 52 analyzes the images acquired by the cameras 36, and acquires information concerning the presence or absence of the obstacles and the rough road locations and their sizes.

Further, the external environment recognition unit 52 calculates distances to the obstacles and the rough road locations using signals from the sonar devices 34, and acquires the positions of the obstacles and the rough road locations, and as a result, acquires a size (area) of a parking space.

The user's own vehicle position identifying unit 54 detects the position of the vehicle 12, based on signals from the GPS receiving unit 42 of the navigation device 28.

Further, in addition to the signals from the GPS receiving unit 42, the user's own vehicle position identifying unit 54 may acquire the vehicle speed Vs and the yaw rate from the vehicle sensors 26, and may specify the position and attitude of the vehicle 12 using so-called inertial navigation.

The external environment recognition unit 52 analyzes the detection results of the external environment sensors 24, and more specifically, the images captured by the cameras 36 based on a well-known image analysis method such as pattern matching or the like, and is capable of acquiring a parking space, for example, from the positions of white lines drawn on a road surface such as that of a parking lot or the like.

Based on a travel control instruction including a movement path (including a movement path for automated parking) from the action planning unit 56, the travel control unit 58 controls the traveling motor 18, the braking device 20, and the steering motor 22, and thereby causes the vehicle 12 to travel.

The storage unit 60 is constituted by a RAM and a ROM (including a rewritable non-volatile memory), and stores information required for processing by the action planning unit 56 and the travel control unit 58.

When there is an input from the vehicle occupant to the HMI 32, as necessary, the action planning unit 56 calculates a trajectory which becomes a movement path for the vehicle 12 (including the movement path for automated parking), and outputs the travel control instruction to the travel control unit 58.

FIG. 2A is a schematic plan view showing an example of a parking lot 70 in which it is intended for a user's own vehicle 12 to be parked, a usage situation of the parking lot 70, and a situation of the surrounding vicinity. In order to facilitate understanding, the directions of east (E), west (W), south (S), and north (N) are drawn on the map.

In the parking lot 70, the region thereof is partitioned by two roads 72 and 74 that extend in the north-south direction, and hedges 77 and 78, which are represented by halftone dots that extend in the east-west direction. The roads 72 and 74 are connected by a pathway 76 that extends in the east-west direction inside the parking lot 70.

Vehicles 81 to 85 are parked in parking spaces at five locations inside the parking lot 70, which are partitioned by the white lines. Parking spaces 88 (88a to 88c) for three vehicles are empty spaces.

The vehicle 12 is traveling in a northward direction on the road 72 at a position before arriving at an entrance to the parking lot 70. Another vehicle 13 is traveling in a southward direction on the road 74.

[Operations]

Figure 3:
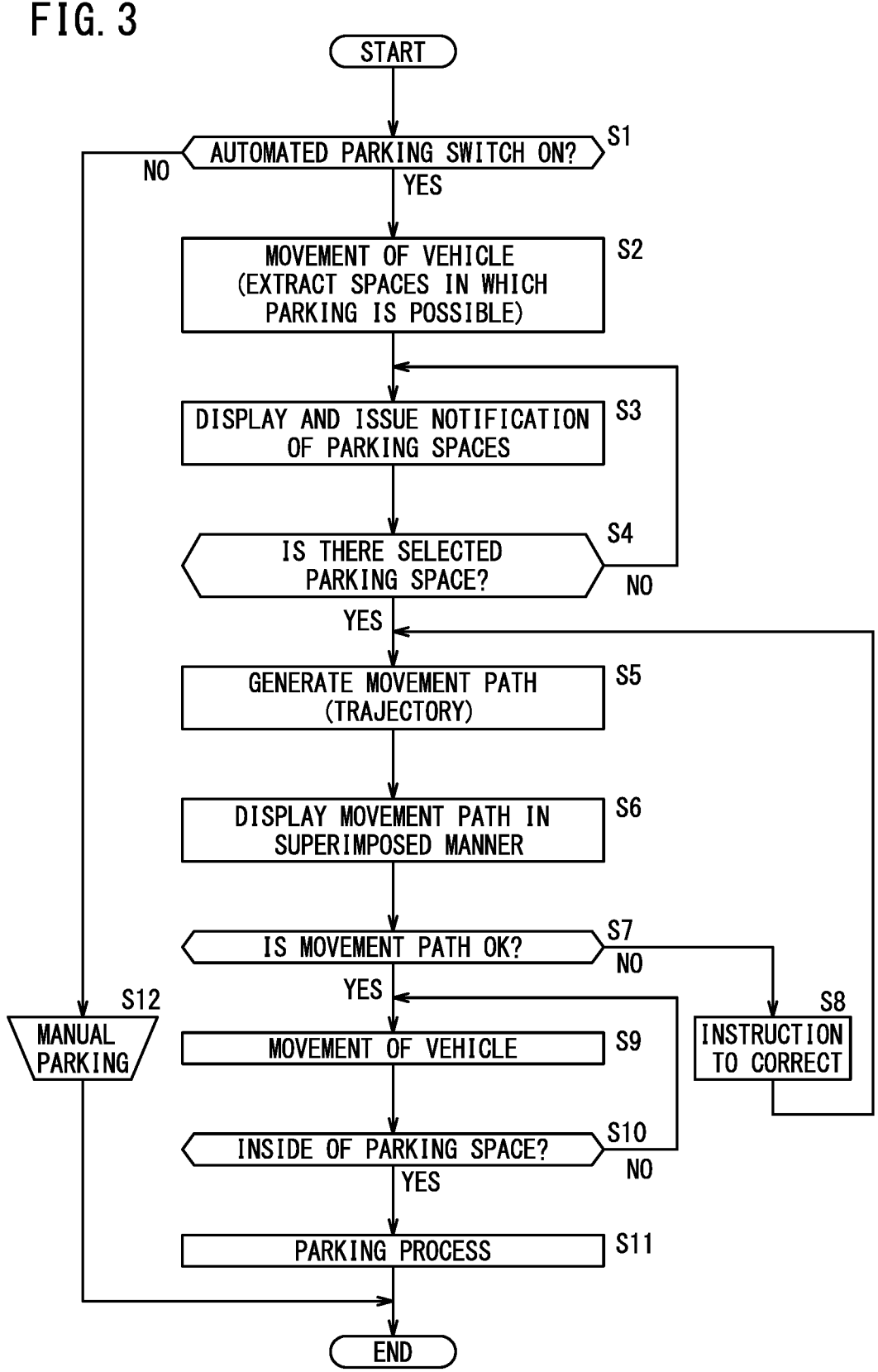
FIG. 3 is a flowchart provided to explain an operation of generating and correcting a parking movement path in the vehicle control device according to the embodiment.

Basically, an automated parking process operation (an operation of generating and correcting a parking movement path) of the vehicle control device 10, which is configured in the manner described above, will be described with reference to the flowchart shown in FIG. 3. The execution subject of the program according to the flowchart is the vehicle control device 10 (in particular, the action planning unit 56).

While traveling on the road 72, the action planning unit 56 determines whether or not the parking lot 70 is a destination by the navigation device 28.

In the case that the parking lot 70 is the destination, the action planning unit 56 causes the vehicle 12 to enter the parking lot 70 by turning to the left, and causes the vehicle to come to a stop at an entrance of the pathway 76 of the parking lot 70 (the vehicle 12 of FIG. 2B is shown by the solid line).

The action planning unit 56 causes an automated parking switch icon to be displayed on the touch panel 37 of the HMI 32 in a state in which the vehicle 12 is stopped at the entrance shown in FIG. 2B, together with the vehicle occupant being prompted by the sound generating device 39 to press the automated parking switch.

In step S1, the action planning unit 56 determines whether or not an ON operation of the automated parking switch icon (an operation with a finger 40 of the vehicle occupant of touching the automated parking switch icon) has been performed on the HMI 32.

When the action planning unit 56 detects the ON operation of the automated parking switch (step S1: YES), the action planning unit 56 initiates the automated parking process.

In step S2, the action planning unit 56 searches for and extracts a space (parking space) in which parking is possible. For this purpose, the action planning unit 56, through the travel control unit 58, causes the vehicle 12 to slowly advance from a stopped position at the entrance shown in FIG. 2B in the westward direction on the pathway 76. In addition, while the travel control unit 58 is causing the vehicle 12 to slowly travel straight ahead, the action planning unit 56 determines, on the basis of signals from the external environment sensors 24, the positions and sizes of obstacles (the vehicles 81 to 85 and the hedges 77 and 78), and the positions of the white lines drawn on the road surface of the parking lot 70.

Figure 4A:
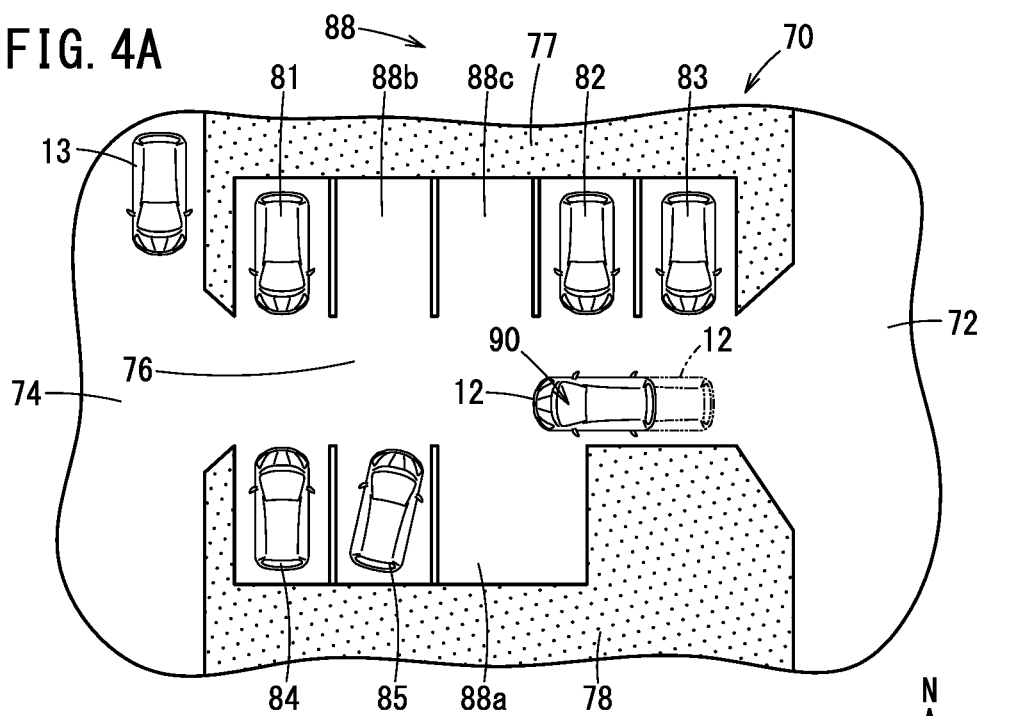
FIG. 4A is a schematic plan view showing a state in which a user's own vehicle is stopped at a movement starting position, which is a generated position of the parking movement path, and which lies within the generated parking movement path.

In this case, as shown in FIG. 4A, the action planning unit 56, via the travel control unit 58, causes the vehicle 12 to stop at a predetermined position {i.e., the position of the parking movement path generated by the action planning unit 56 according to the present embodiment, and which is a movement starting position (travel starting position) 90 within the generated parking movement path} facing toward the parking space 88a.

At this time, the action planning unit 56 extracts spaces 88 (88a, 88b, and 88c) in which parking is possible, based on the acquired positions and sizes of the obstacles (vehicles 81 to 85) and the rough road location (puddle 86), which is a path generation avoidance location, and the white lines. At the same time, in order to generate the movement path for enabling parking of the vehicle 12 inside the parking lot 70, the action planning unit 56 defines a movement capable region (a region in which the movement path can be generated) 92 (the region surrounded by the thick two-dot dashed line), which includes the parking spaces 88 (88a to 88c) into which the vehicle 12 is capable of moving, and from which the regions of the parked vehicles 81 to 85 and the hedges 77 and 78 are excluded.

Next, in step S3, the action planning unit 56 displays a schematic plan view (in general, the schematic image shown in FIG. 4B) including the parking spaces 88 (88a to 88c) on the HMI 32 (the touch panel 37), and a notification thereof is issued to the vehicle occupant by way of voice through the sound generating device 39. At this time, the action planning unit 56 may also display on the touch panel 37 an image acquired by the cameras 36, by converting the coordinates thereof into a planar image, and superimposing the image.

Figure 4B:
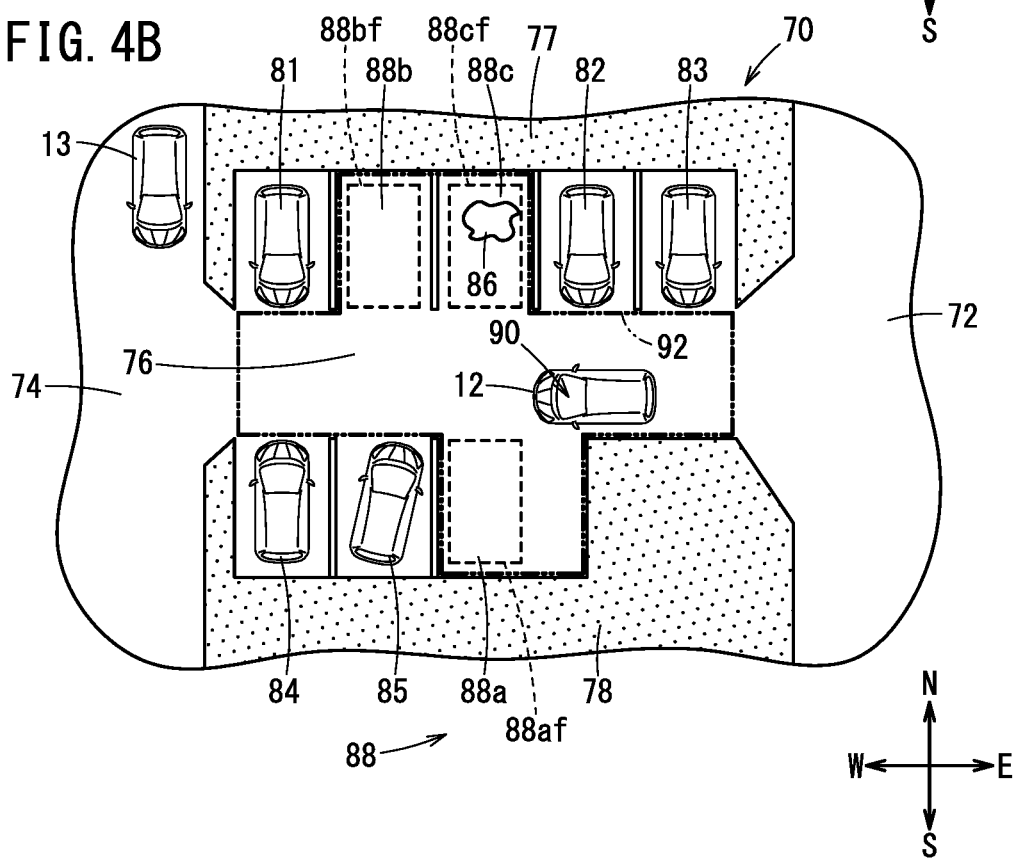
FIG. 4B is a schematic plan view showing an empty parking space and a region in which a path can be generated, which are recognized by an external environment recognition unit of the vehicle at the movement starting position of the parking movement path.

Moreover, in the schematic plan view shown in FIG. 4B, parking frames 88af, 88bf, and 88cf, which serve to indicate that the parking spaces 88 (88a to 88c) exist, are shown by the dashed lines.

Next, in step S4, via the HMI 32 (the touch panel 37), which functions as a parking space selection unit, a desired parking space (in the present embodiment, a wide parking space 88a) from among the parking spaces 88a to 88c is selected by a touch operation of the vehicle occupant (step S4: YES). When the parking space 88a is selected, the HMI 32 (the touch panel 37) outputs, to the action planning unit 56, a signal corresponding to the selected parking space 88a, whereupon the process proceeds to step S5. At this time, the parking frame 88af of the selected parking space 88a is changed from a dashed line frame display to a solid line frame display.

After selection of the parking space 88a in step S4 (step S4: YES), in step S5, the action planning unit 56 generates (calculates) a movement path (trajectory) within the movement capable region 92, from the current position {the movement starting position (parking starting position) 90 which is a predetermined position} of the vehicle 12, which is the starting position of the automated parking movement path, until reaching the interior of the parking space 88a (the parking frame 88af), which is the ending position of the parking movement path, whereupon the process proceeds to step S6.

Figure 5:
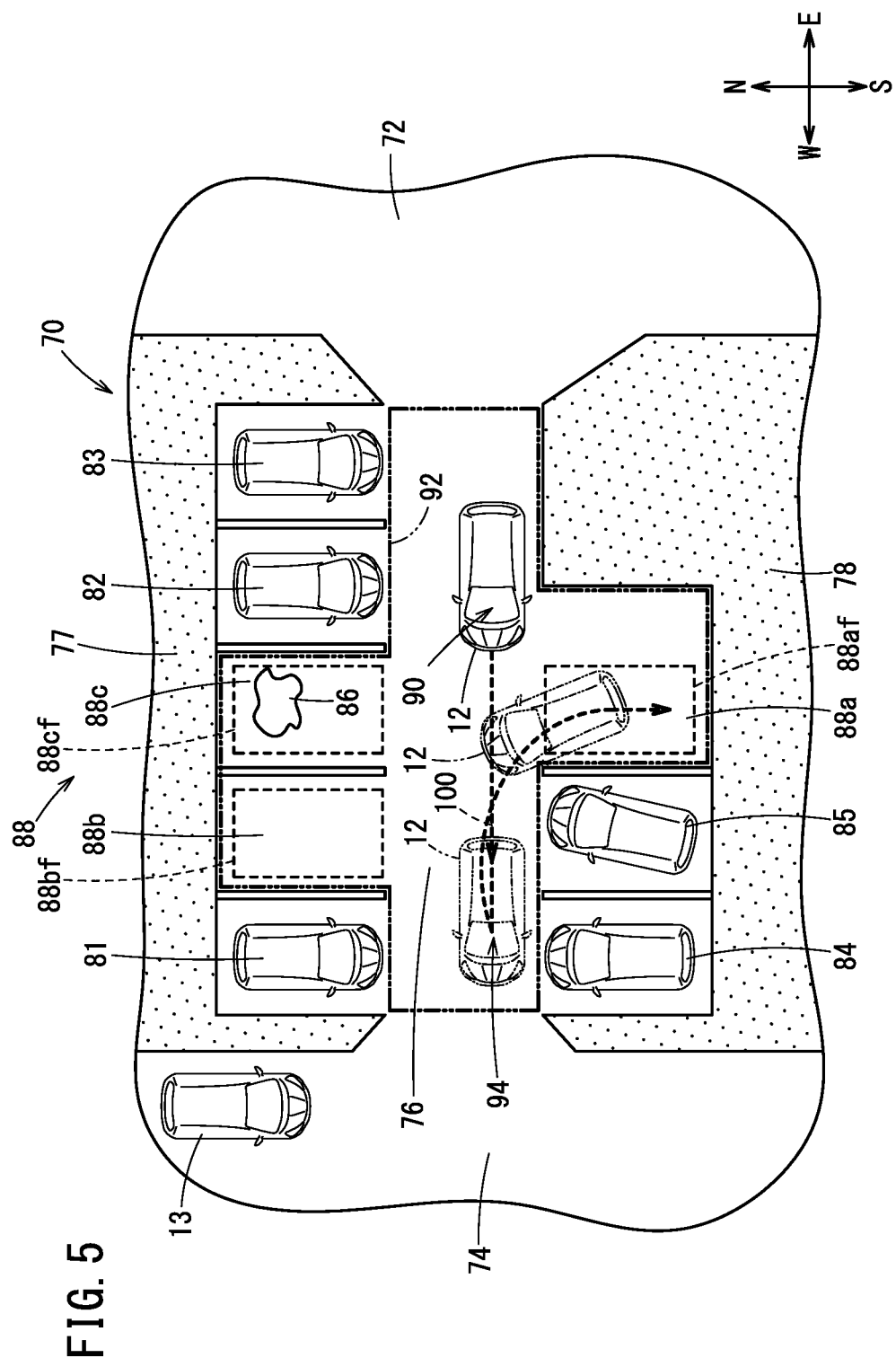
FIG. 5 is a schematic plan view in which an initially created movement path is displayed in a superimposed manner on a schematic plan view of a parking lot.

In step S6, a movement path 100 calculated in step S5 is superimposed on the schematic plan view of the parking lot 70 shown in FIG. 4B, and displayed on the touch panel 37 (FIG. 5).

As shown in FIG. 5, the movement path 100, which is displayed in a superimposed manner on the schematic plan view of the parking lot 70, is a path in which the vehicle 12 slowly travels straight in a westward direction from the movement starting position 90, stops at a predetermined position 94, and at the stopped position, the front wheels 16F are steered while remaining stationary, and reverse parking into the parking space 88a is carried out with a minimum turning radius of the rear wheels 16R.

Next, in step S7, whether or not the vehicle may start traveling along the movement path 100 (whether or not the movement path 100 is OK) in order to perform automated parking from the movement starting position 90 into the parking space 88a (the parking frame 88af) is confirmed to the vehicle occupant on the HMI 32.

In the case of a negative confirmation (step S7: NO), then in step S8, the vehicle occupant carries out an instruction to avoid the travel avoidance location, and in particular, and instruction to correct the movement path 100, according to guidance provided on a screen of the touch panel 37 by the HMI 32 and/or guidance from the sound generating device 39.

After the vehicle occupant has given an instruction to avoid the travel avoidance location with the finger 40 (step S8), the action planning unit 56 corrects the movement path 100 and generates a movement path 102 in step S5 again. FIG. 6 is a schematic plan view showing a state in which the movement path 102 is displayed in a superimposed manner in step S6.

In this case, in the instruction to correct the movement path 100 in step S8, a situation is avoided in which the user's own vehicle 12 comes too close to the road 74 on the west side in which the vehicle 13 is traveling, and as shown by the white outline arrow 104, (i) the boundary line at the left end of the movement capable region 92 is slid by the vehicle occupant toward the east side by a drag and drop operation with the finger 40 on the touch panel 37. More specifically, the vehicle occupant provides an instruction so that, on the pathway 76 within the parking lot 70 which is included in the movement capable region 92, a portion thereof on a side in proximity to the road 74 through which the other vehicle 13 is passing is made into a movement incapable region 93 which serves as the travel avoidance location on the movement path 100 (see FIG. 5). By such an instruction, as shown in FIG. 6, the movement capable region 92 (FIG. 5) is narrowed into a movement capable region (a region in which the movement path can be generated) 92' from which the movement incapable region 93 is excluded.

Further, (ii) by the drag and drop operation with the finger 40 on the touch panel 37, the predetermined position 94 (FIG. 5), which is a position at which stationary steering of the front wheels 16F is carried out within the movement path 100, is moved to a new predetermined position 98 where switching back is performed.

Furthermore, (iii) by a double-click operation with the finger 40 on the touch panel 37, a circular region is designated on a right front portion of the parked vehicle 85, which serves as a position of an obstacle (path detour location 87), so as to create the movement path as far away as possible from the right front portion of the parked vehicle 85. Similarly, (iv) within the movement path, a circular region is designated by a double-click operation with the finger 40 on the touch panel 37, so as to avoid the puddle 86 (path generation avoidance location).

In this case, since the instruction made by the finger 40, which functions as a pointing device, can be performed using a similar operation to an operation on a smartphone or a personal computer, such an operation is friendly to the vehicle occupant.

After having executed such an instruction to correct, in step S5 again, the movement path 100 shown in FIG. 5 is changed and generated (regenerated) into the movement path 102 shown in FIG. 6. Moreover, in step S5, in the case that the movement path in accordance with the instruction to correct cannot be regenerated, the action planning unit 56 provides an output to such an effect (the region 92' in which the movement path can be generated after correction is too narrow, or the like) by way of display or voice through the HMI 32, and prompts the vehicle occupant to make the correction again.

In step S6, the regenerated movement path 102 is displayed in a superimposed manner on the screen of the touch panel 37, and in the case that the movement path 102 is judged to be OK in step S7 (step S7: YES), then in step S9, movement of the vehicle 12 (the automated parking control) along the movement path 102 is executed.

More specifically, in step S9, the travel control unit 58 controls the traveling motor 18, the braking device 20, and the steering motor 22 along the movement path 102 (see FIG. 6) that was regenerated by the action planning unit 56 in step S5, and thereby controls traveling of the vehicle 12. In step S10, when it is determined that the vehicle 12 has moved inside the parking space 88a (has reached the end position of the parking movement path 102) (step S10: YES), the vehicle 12 is made to stop.

After movement to the parking space 88a is completed, then in step S11, the action planning unit 56 performs a parking process for causing the vehicle 12 to be parked. In such a parking process, the action planning unit 56 drives the braking device 20 through the travel control unit 58. Thereafter, the action planning unit 56 activates a non-illustrated electric parking brake through the travel control unit 58. In this manner, when stopping of the vehicle 12 is completed, the action planning unit 56 performs a display on the touch panel 37 of the HMI 32 to indicate that parking has been completed, together with issuing a notification to the vehicle occupant through the sound generating device 39 to the effect that parking has been completed.

Thereafter, the vehicle occupant exits the vehicle, and locks the vehicle using the smart key 33. Moreover, in step S1, in the case that the vehicle occupant has turned off the automated parking switch, then in step S12, manual parking is implemented by the driver operating the driving operation devices 30.

Inventions that can be Grasped from the Embodiment

In this instance, the inventions that can be grasped from the above-described embodiment will be described below. Although to facilitate understanding, the constituent elements are designated by the reference numerals used in the above-described embodiment, the constituent elements are not limited to those elements to which such reference numerals are applied.

The vehicle control device 10 according to the present invention causes the user's own vehicle 12 to be automatically parked inside the parking space 88, based on outputs of the external environment sensors 24 provided in the user's own vehicle 12, the vehicle control device 10 comprising the external environment recognition unit 52 which recognizes the movement capable region 92 for the user's own vehicle 12 based on the outputs of the external environment sensors 24, the display unit 37 that displays the movement capable region 92 for the user's own vehicle 12 as recognized by the external environment recognition unit 52 and the parking space 88, the pointing unit 40 which enables selection of a desired parking space 88a from the display on the display unit 37, and the action planning unit 56 that generates the parking movement path 100 from the starting position of parking 90 to a position inside the selected parking space 88a, and displays the parking movement path 100 in a superimposed manner on the display unit 37, wherein the pointing unit 40 is capable of providing an instruction to correct the movement path 100 generated by the action planning unit 56, and in the case that the instruction to correct the movement path 100 is provided by the pointing unit 40, the action planning unit 56 regenerates the movement path 102 within the movement capable region 92 in accordance with the instruction to correct, and may display the regenerated movement path 102 in a superimposed manner on the movement capable region 92 on the display unit 37.

In accordance with such a configuration, the movement path 102 is regenerated within the movement capable region 92 in accordance with the instruction to correct the movement path 100 by the pointing unit 40, and the regenerated movement path 102 is displayed on the display unit 37 in a superimposed manner on the movement capable region 92 for the user's own vehicle 12, whereby, without changing the parking space (position) 88a in which the vehicle occupant desires to park, it is possible for parking to be performed along the desired movement path 102 to the desired parking space 88a.

Further, in the vehicle control device 10, the pointing unit 40 is capable of providing an instruction to correct the movement capable region 92, and in the case that an instruction to correct the movement capable region 92 is provided by the pointing unit 40, the action planning unit 56 regenerates the movement path 102 in accordance with the instruction to correct the movement path 100 within the movement capable region 92' corrected in accordance with the instruction to correct the movement capable region 92, and displays the regenerated movement path 102 in a superimposed manner on the corrected movement capable region 92' on the display unit 37.

In accordance with such a configuration, since the vehicle occupant is capable of correcting the movement capable region 92 for the vehicle 12 by the pointing unit 40, for example, by correcting a portion of the movement capable region 92 that the vehicle occupant seeks to avoid to the movement incapable region 93, the movement incapable region 93 that the vehicle occupant seeks to avoid can be excluded from the movement path 102 leading to the parking space 88a.

In this case, by displaying the regenerated movement path 102 in a superimposed manner on the movement capable region 92', it is possible to easily visually confirm whether or not movement into the movement incapable region 93 desired by the vehicle occupant is avoided.

Furthermore, in the vehicle control device 10 according to the present invention, the pointing unit 40 is capable of designating a path generation avoidance location 86 located within the movement capable region 92 or 92', and in the case that the path generation avoidance location 86 located within the movement capable region 92 or 92' is designated by the pointing unit 40, the action planning unit 56 may regenerate the movement path 102 within the movement capable region 92 or 92' in which the path generation avoidance location 86 is excluded.

In accordance with such a configuration, since the vehicle occupant is capable of designating the path generation avoidance location 86 within the movement capable region 92 or 92' for the vehicle 12 by the pointing unit 40, for example, the movement path 102 can be easily regenerated in which the path generation avoidance location 86 such as a puddle 86, a muddy area, or the like is avoided.

Further still, in the vehicle control device 10 according to the present invention, the pointing unit 40 is capable of designating the path detour location 87 located outside of the movement capable region 92 or 92', and in the case that the path detour location 87 located outside of the movement capable region 92 or 92' is designated by the pointing unit 40, the action planning unit 56 may regenerate the movement path 102 that bypasses the path detour location 87 within the movement capable region 92 or 92'.

In accordance with such a configuration, since the vehicle occupant is capable of designating even the path detour location 87 located outside of the movement capable region 92 or 92' for the vehicle 12 by the pointing unit 40, for example, the movement path 102 can be easily regenerated in which a parked vehicle 85 located outside of the movement capable region 92 or 92' and parked in the vicinity of the movement capable region 92 or 92' is bypassed.

The present invention is not limited to the above-described embodiment, but it goes without saying that various additional or alternative configurations could be adopted therein based on the content disclosed in the present specification.

What is claimed is:

1. A vehicle control device configured to cause a user's own vehicle to be automatically parked inside a parking space, based on outputs of external environment sensors provided in the user's own vehicle, the vehicle control device comprising:

a screen of a touch panel configured to receive pointing input by an operator on the screen of the touch panel; and one or more processors that execute computer-executable instructions stored in a memory, wherein the one or more processors execute the computer-executable instructions to cause the vehicle control device to recognize a movement capable region for the user's own vehicle based on the outputs of the external environment sensors, the screen of the touch panel is configured to display the recognized movement capable region for the user's own vehicle and a parking space, and receive the pointing input of selecting a desired parking space from a display on the screen of the touch panel, and the one or more processors further cause the vehicle control device to generate a movement path for parking from a starting position of parking to a position inside the selected parking space, and display the movement path in a superimposed manner on the screen of the touch panel, and wherein the screen of the touch panel is further configured to receive pointing input of an instruction to correct the generated movement path, in a case that the pointing input of the instruction to correct the movement path is received, the one or more processors cause the vehicle control device to regenerate the movement path within the movement capable region in accordance with the instruction to correct, and display the regenerated movement path in a superimposed manner on the movement capable region on the screen of the touch panel, and the one or more processors cause the vehicle control device further accepts pointing input to correct the movement path that includes a position inside another parking space which is different from the selected parking space.

2. The vehicle control device according to claim 1, wherein the screen of the touch panel is configured to accept pointing input that provides an instruction to correct the movement capable region, and in a case that an instruction to correct the movement capable region is provided as pointing input, the one or more processors cause the vehicle control device to regenerate the movement path in accordance with the instruction to correct the movement path within the movement capable region corrected in accordance with the instruction to correct the movement capable region, and display the regenerated movement path in a superimposed manner on the corrected movement capable region on the display unit.

3. The vehicle control device according to claim 1, wherein the screen of the touch panel is configured to accept pointing input that designates a path generation avoidance location located within the movement capable region, and in a case that the path generation avoidance location located within the movement capable region is designated as pointing input, the one or more processors cause the vehicle control device to regenerate the movement path within the movement capable region in which the path generation avoidance location is excluded.

4. The vehicle control device according to claim 1, wherein the screen of the touch panel is configured to accept pointing input that designates a path detour location located outside of the movement capable region, and in a case that the path detour location located outside of the movement capable region is designated as pointing input, the one or more processors cause the vehicle control device to regenerate the movement path that bypasses the path detour location within the movement capable region.

* * * * *